Figure 1:
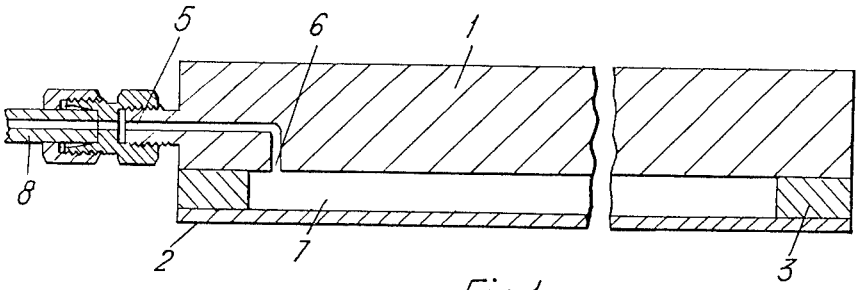
Figure 3:
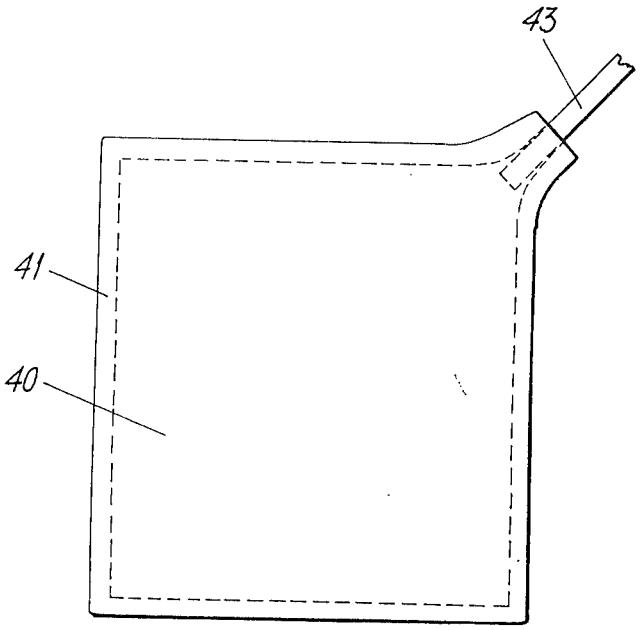
Figure 2:
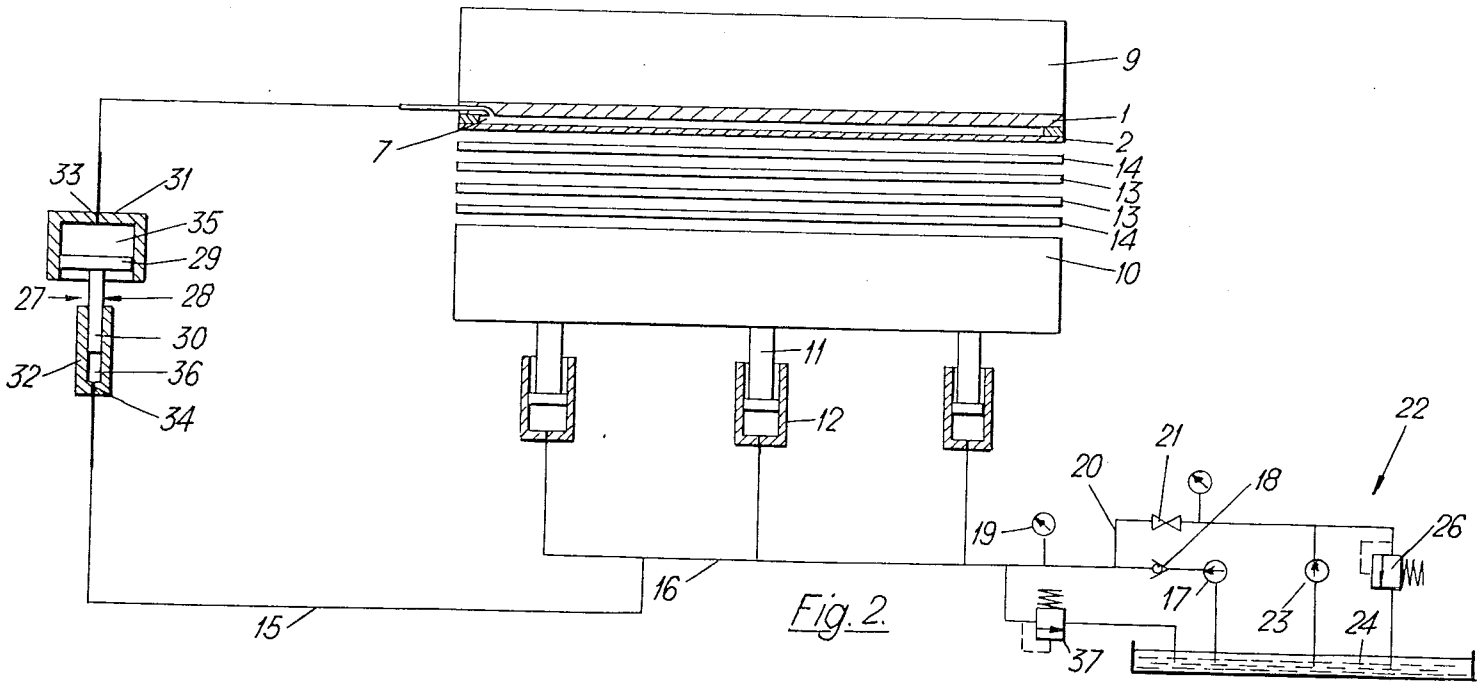
Figure 4:
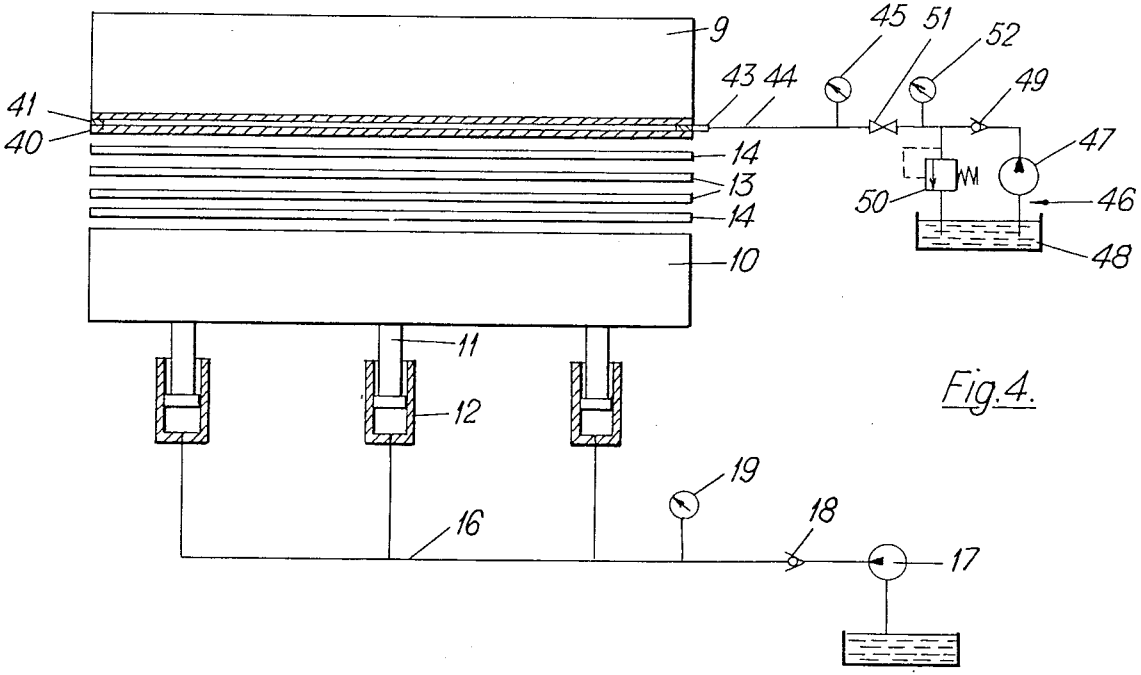

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED OCTOBER 7, 1975

939 O.G. 7

T939,001
PRESSING

Kenneth Clarke, Knebworth, and Thomas Alfred Stanley, Welwyn Garden City, England, assignors to Imperial Chemical Industries Limited, London, England

Filed Oct. 30, 1972, Ser. No. 301,727
Claims priority, application Great Britain, Nov. 5, 1971, 51,487/71
Int. Cl. B30b *15/34;* B02c *11/08*
U.S. Cl. 100—38
4 Sheets Drawing. 42 Pages Specification

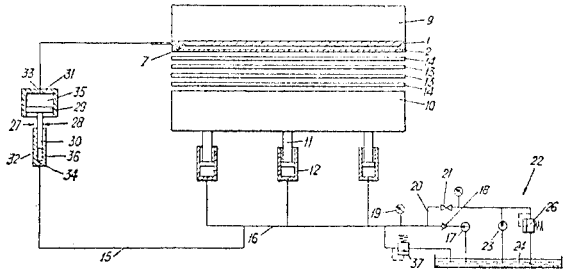

A method of making a pressed article including the step of pressing a workpiece and at least one resilient liquid-filled cushion plate between the platens of a press and heating, or optionally cooling, the workpiece and cushion plate during the pressing operation is disclosed. The pressing operation is accomplished such that the volume of liquid in the chamber of the cushion plate is maintained substantially constant by providing means responsive to the pressure within the cushion plate to accept the increase in volume of liquid brought about by the thermal expansion of the liquid filling the chamber in the heated embodiment, or to introduce additional liquid into the closed chamber when the pressing is conducted and the workpiece is cooled.

The disclosed resilient cushion plate includes a pair of continuous metal sheets spaced apart from each other in a substantially parallel manner, at least one of the sheets being relatively thin and flexible. The sheets are sealed together around their peripheries to define an inner chamber which can be completely filled with a liquid and the plate is provided with an entrance leading into the chamber positioned so as to not interfere with the pressing operation. The entry port permits the filling of the chamber with liquid and provides for communication to and from the chamber for accommodating the expansion or contraction of liquid within the chamber, depending upon pressing conditions. The invention is particularly adapted for pressing sheets of plastics materials and an apparatus for conducting the method is also described.